United States Patent
Zhang et al.

(10) Patent No.: US 11,818,612 B2
(45) Date of Patent: Nov. 14, 2023

(54) USER EQUIPMENT SELECTION OF CANDIDATE AND SELECTED CELLS

(71) Applicant: QUALCOMM Incorporated, San Diego, CA (US)

(72) Inventors: Qian Zhang, Basking Ridge, NJ (US); Yan Zhou, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/131,170

(22) Filed: Dec. 22, 2020

(65) Prior Publication Data

US 2021/0219195 A1 Jul. 15, 2021

Related U.S. Application Data

(60) Provisional application No. 62/961,128, filed on Jan. 14, 2020.

(51) Int. Cl.
| | |
|---|---|
| *H04W 36/00* | (2009.01) |
| *H04W 76/11* | (2018.01) |
| *H04W 76/27* | (2018.01) |
| *H04W 80/02* | (2009.01) |
| *H04W 56/00* | (2009.01) |

(52) U.S. Cl.
CPC ............ *H04W 36/00837* (2018.08); *H04W 36/00835* (2018.08); *H04W 56/001* (2013.01); *H04W 76/11* (2018.02); *H04W 76/27* (2018.02); *H04W 80/02* (2013.01)

(58) Field of Classification Search
CPC ..... H04W 36/00837; H04W 36/00835; H04W 36/0011; H04W 36/0016; H04W 36/0058; H04W 36/0061; H04W 36/0083; H04W 36/0005; H04W 56/001; H04W 76/11; H04W 76/27; H04W 76/25; H04W 76/20; H04W 74/004; H04W 80/02
See application file for complete search history.

(56) References Cited

U.S. PATENT DOCUMENTS

| | | | |
|---|---|---|---|
| 6,845,238 B1 * | 1/2005 | Muller ................. | H04W 36/18 455/442 |
| 2009/0291686 A1 * | 11/2009 | Alpert ............... | H04W 36/0085 455/436 |
| 2010/0279679 A1 * | 11/2010 | Young ............... | H04W 36/0085 455/423 |

(Continued)

FOREIGN PATENT DOCUMENTS

| | | | |
|---|---|---|---|
| KR | WO2019245335 | * | 11/2019 |
| WO | WO-2020032503 A1 | * | 2/2020 |

*Primary Examiner* — Sudesh M Patidar
(74) *Attorney, Agent, or Firm* — Harrity & Harrity, LLP

(57) ABSTRACT

Various aspects of the present disclosure generally relate to wireless communication. In some aspects, a user equipment (UE) may select, from a set of one or more neighbor cells, a set of one or more candidate cells for an inter-cell mobility operation; determine, from the set of one or more candidate cells, a set of one or more selected cells for the inter-cell mobility operation; add the set of one or more selected cells to a cell group of the UE; and transmit, to a base station, at least one of: the set of one or more candidate cells, or the set of one or more selected cells. Numerous other aspects are provided.

30 Claims, 8 Drawing Sheets

(56) References Cited

U.S. PATENT DOCUMENTS

| | | | |
|---|---|---|---|
| 2010/0317350 A1* | 12/2010 | Lee | H04W 36/0016 |
| | | | 455/442 |
| 2011/0047029 A1* | 2/2011 | Nair | G06Q 30/0254 |
| | | | 455/436 |
| 2017/0289902 A1* | 10/2017 | Mochizuki | H04B 7/024 |
| 2017/0311217 A1* | 10/2017 | Jung | H04W 36/30 |
| 2018/0227822 A1* | 8/2018 | Lin | H04W 36/30 |
| 2019/0021036 A1* | 1/2019 | Shimizu | H04W 36/26 |
| 2019/0053135 A1* | 2/2019 | Hahn | H04W 88/08 |
| 2019/0190582 A1* | 6/2019 | Guo | H04W 72/046 |
| 2020/0213067 A1* | 7/2020 | Cirik | H04L 5/0098 |
| 2020/0351722 A1* | 11/2020 | Yang | H04W 36/08 |
| 2021/0235336 A1* | 7/2021 | Martin | H04W 36/08 |
| 2021/0360495 A1* | 11/2021 | Lovlekar | H04W 36/08 |
| 2021/0385676 A1* | 12/2021 | Yu | H04W 56/00 |
| 2022/0124538 A1* | 4/2022 | Shen | H04W 36/0058 |
| 2022/0312532 A1* | 9/2022 | Rugeland | H04W 76/20 |

* cited by examiner

USER EQUIPMENT SELECTION OF CANDIDATE AND SELECTED CELLS

CROSS-REFERENCE TO RELATED APPLICATION

This patent application claims priority to U.S. Provisional Patent Application No. 62/961,128, filed on Jan. 14, 2020, entitled "USER EQUIPMENT SELECTION OF CANDIDATE AND SELECTED CELLS," and assigned to the assignee hereof. The disclosure of the prior application is considered part of and is incorporated by reference into this patent application.

FIELD OF THE DISCLOSURE

Aspects of the present disclosure generally relate to wireless communication and specifically, to techniques and apparatuses for user equipment (UE) selection of candidate or selected cells.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth, or transmit power, among other examples, or a combination thereof). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

The above multiple access technologies have been adopted in various telecommunication standards to provide a common protocol that enables different user equipments (UEs) to communicate on a municipal, national, regional, and even global level. New Radio (NR), which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM or SC-FDMA (for example, also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements are applicable to other multiple access technologies and the telecommunication standards that employ these technologies.

A UE may perform an inter-cell mobility operation in order to update a serving cell, or a set of one or more candidate cells from which the serving cell is selected. In some cases, the UE may perform a Layer 1 (physical layer) or a Layer 2 (medium access control (MAC) layer) inter-cell mobility operation, which may reduce latency and conserve higher-layer computing resources of the UE. Typically, the UE determines a cell quality measurement, and transmits the cell quality measurement to a base station. The base station determines a selected cell as well as a set of one or more candidate cells, and indicates the selected cell or the set of one or more candidate cells to the UE. However, base station-side determination of the selected cells or the set of one or more candidate cells may increase latency and overhead at the UE, as well as consume computing resources of the base station.

SUMMARY

In some aspects, a method of wireless communication, performed by a user equipment (UE), may include selecting, from a set of one or more neighbor cells, a set of one or more candidate cells for an inter-cell mobility operation; determining, from the set of one or more candidate cells, a set of one or more selected cells for the inter-cell mobility operation; transmitting, to a base station, at least one of: the set of one or more candidate cells, or the set of one or more selected cells; and adding the set of one or more selected cells to a cell group of the UE.

In some aspects, a method of wireless communication, performed by a base station, may include receiving, from a UE, information identifying at least one of a set of one or more candidate cells or a set of one or more selected cells for the UE, the set of one or more selected cells being selected from the set of one or more candidate cells; and performing an inter-cell mobility operation in accordance with the information identifying at least one of a set of one or more candidate cells or a set of one or more selected cells.

In some aspects, a UE for wireless communication may include a memory and one or more processors operatively coupled to the memory. The memory and the one or more processors may be configured to select, from a set of one or more neighbor cells, a set of one or more candidate cells for an inter-cell mobility operation; determine, from the set of one or more candidate cells, a set of one or more selected cells for the inter-cell mobility operation; transmit, to a base station, at least one of: the set of one or more candidate cells, or the set of one or more selected cells; and add the set of one or more selected cells to a cell group of the UE.

In some aspects, a base station for wireless communication may include a memory and one or more processors operatively coupled to the memory. The memory and the one or more processors may be configured to receive, from a UE, information identifying at least one of a set of one or more candidate cells or a set of one or more selected cells for the UE, the set of one or more selected cells being selected from the set of one or more candidate cells; and perform an inter-cell mobility operation in accordance with the information identifying at least one of a set of one or more candidate cells or a set of one or more selected cells.

In some aspects, a non-transitory computer-readable medium may store one or more instructions for wireless communication. The one or more instructions, when executed by one or more processors of a UE, may cause the one or more processors to select, from a set of one or more neighbor cells, a set of one or more candidate cells for an inter-cell mobility operation; determine, from the set of one or more candidate cells, a set of one or more selected cells for the inter-cell mobility operation; transmit, to a base station, at least one of: the set of one or more candidate cells, or the set of one or more selected cells; and add the set of one or more selected cells to a cell group of the UE.

In some aspects, a non-transitory computer-readable medium may store one or more instructions for wireless communication. The one or more instructions, when executed by one or more processors of a base station, may cause the one or more processors to receive, from a UE, information identifying at least one of a set of one or more candidate cells or a set of one or more selected cells for the UE, the set of one or more selected cells being selected from the set of one or more candidate cells; and perform an inter-cell mobility operation in accordance with the information identifying at least one of a set of one or more candidate cells or a set of one or more selected cells.

In some aspects, an apparatus for wireless communication may include means for selecting, from a set of one or more neighbor cells, a set of one or more candidate cells for an inter-cell mobility operation; means for determining, from the set of one or more candidate cells, a set of one or more selected cells for the inter-cell mobility operation; means for transmitting, to a base station, at least one of: the set of one or more candidate cells, or the set of one or more selected cells; and means for adding the set of one or more selected cells to a cell group of the apparatus.

In some aspects, an apparatus for wireless communication may include means for receiving, from a UE, information identifying at least one of a set of one or more candidate cells or a set of one or more selected cells for the UE, the set of one or more selected cells being selected from the set of one or more candidate cells; and means for performing an inter-cell mobility operation in accordance with the information identifying at least one of a set of one or more candidate cells or a set of one or more selected cells.

Aspects generally include a method, apparatus, system, computer program product, non-transitory computer-readable medium, user equipment, base station, wireless communication device, and processing system as substantially described with reference to and as illustrated by the drawings and specification.

The foregoing has outlined rather broadly the features and technical advantages of examples in accordance with the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only some typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
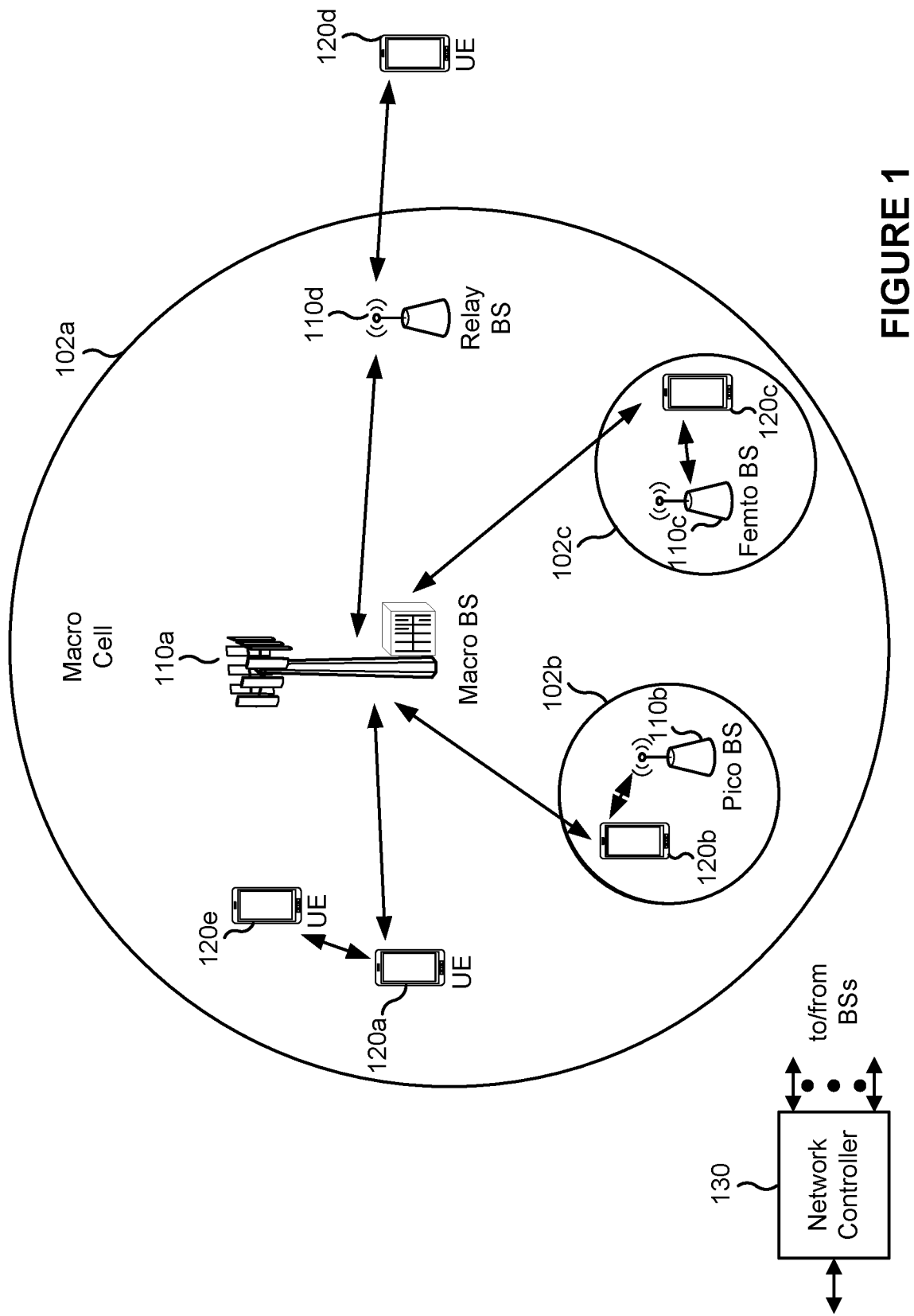
FIG. 1 is a block diagram illustrating an example wireless network, in accordance with various aspects of the present disclosure.

Various aspects of the disclosure are described more fully hereinafter with reference to the accompanying drawings. This disclosure may, however, be embodied in many different forms and are not to be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art may appreciate that the scope of the disclosure is intended to cover any aspect of the disclosure disclosed herein, whether implemented independently of or combined with any other aspect of the disclosure. For example, an apparatus may be implemented or a method may be practiced using any quantity of the aspects set forth herein. In addition, the scope of the disclosure is intended to cover such an apparatus or method which is practiced using other structure, functionality, or structure and functionality in addition to or other than the various aspects of the disclosure set forth herein. Any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, or algorithms, among other examples, or combinations thereof (collectively referred to as "elements"). These elements may be implemented using hardware, software, or combinations thereof. Whether such elements are implemented as hardware or software depends upon the particular application and design constraints imposed on the overall system.

A user equipment (UE) may perform an inter-cell mobility operation in order to update a serving cell or a set of one or more candidate cells from which the serving cell is selected. In some cases, the UE may perform a Layer 1 (physical layer) or a Layer 2 (medium access control (MAC) layer) inter-cell mobility operation, which may reduce latency and conserve higher-layer computing resources of the UE relative to a higher-layer inter-cell mobility operation. Typically, the UE determines a cell quality measurement and transmits the cell quality measurement to a base station. The base station determines a selected cell as well as a set of one or more candidate cells and indicates the selected cell or the set of one or more candidate cells to the UE. However, base station-side determination of the selected cells or the set of one or more candidate cells may increase latency and overhead at the UE, as well as consume computing resources of the base station.

Various aspects relate generally to UE-side determination of a set of one or more candidate cells from which to select a selected cell, and selection of the selected cell from the set of one or more candidate cells. Some aspects more specifically relate to selection, by the UE, of the set of one or more candidate cells from a set of one or more neighbor cells. In some aspects, the UE may select a candidate cell or a selected cell in accordance with one or more thresholds for cell quality metrics, which may be configured by the base station. In some aspects, the UE may transmit information indicating a set of one or more candidate cells or a selected cell, for example, via a current serving cell of the UE or via the selected cell.

Particular aspects of the subject matter described in this disclosure can be implemented to realize one or more of the following potential advantages. In some examples, the described techniques can be used to reduce latency and overhead, such as latency and overhead associated with a Layer 1 inter-cell mobility operation. Furthermore, the described techniques can be used to conserve base station computing resources.

FIG. 1 is a block diagram illustrating an example wireless network in accordance with various aspects of the present disclosure. The wireless network may be a Long Term Evolution (LTE) network or some other wireless network, such as a 5G or NR network. The wireless network may include a quantity of base stations (BSs) 110 (shown as BS 110a, BS 110b, BS 110c, and BS 110d) and other network entities. A BS is an entity that communicates with UE(s) and may also be referred to as a Node B, an eNodeB, an eNB, a gNB, a NR BS, a 5G node B (NB), an access point (AP), or a transmit receive point (TRP), among other examples, or combinations thereof (these terms are used interchangeably herein). Each BS may provide communication coverage for a particular geographic area. In 3GPP, the term "cell" can refer to a coverage area of a BS or a BS subsystem serving this coverage area, depending on the context in which the term is used.

A BS may provide communication coverage for a macro cell, a pico cell, a femto cell, or another type of cell. A macro cell may cover a relatively large geographic area (for example, several kilometers in radius) and may allow unrestricted access by UEs with service subscription. A pico cell may cover a relatively small geographic area and may allow unrestricted access by UEs with service subscription. A femto cell may cover a relatively small geographic area (for example, a home) and may allow restricted access by UEs having association with the femto cell (for example, UEs in a closed subscriber group (CSG)). A BS for a macro cell may be referred to as a macro BS. A BS for a pico cell may be referred to as a pico BS. A BS for a femto cell may be referred to as a femto BS or a home BS. A BS may support one or multiple (for example, three) cells.

The wireless network may be a heterogeneous network that includes BSs of different types, for example, macro BSs, pico BSs, femto BSs, or relay BSs, among other examples, or combinations thereof. These different types of BSs may have different transmit power levels, different coverage areas, and different impacts on interference in the wireless network. For example, macro BSs may have a high transmit power level (for example, 5 to 40 watts) whereas pico BSs, femto BSs, and relay BSs may have lower transmit power levels (for example, 0.1 to 2 watts). In the example shown in FIG. 1, a BS 110a may be a macro BS for a macro cell 102a, a BS 110b may be a pico BS for a pico cell 102b, and a BS 110c may be a femto BS for a femto cell 102c. A network controller 130 may couple to the set of BSs 102a, 102b, 110a and 110b, and may provide coordination and control for these BSs. Network controller 130 may communicate with the BSs via a backhaul. The BSs may also communicate with one another, for example, directly or indirectly via a wireless or wireline backhaul.

In some aspects, a cell may not be stationary, rather, the geographic area of the cell may move in accordance with the location of a mobile BS. In some aspects, the BSs may be interconnected to one another or to one or more other BSs or network nodes (not shown) in the wireless network through various types of backhaul interfaces such as a direct physical connection, or a virtual network, among other examples, or combinations thereof using any suitable transport network.

The wireless network may also include relay stations. A relay station is an entity that can receive a transmission of data from an upstream station (for example, a BS or a UE) and send a transmission of the data to a downstream station (for example, a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, or a relay, among other examples, or combinations thereof.

UEs 120 (for example, 120a, 120b, 120c) may be dispersed throughout the wireless network, and each UE may be stationary or mobile. A UE may also be referred to as an access terminal, a terminal, a mobile station, a subscriber unit, or a station, among other examples, or combinations thereof. A UE may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (for example, smart ring, smart bracelet)), an entertainment device (for example, a music or video device, or a satellite radio), a vehicular component or sensor, smart meters/sensors, industrial manufacturing equipment, a global positioning system device, or any other suitable device that is configured to communicate via a wireless medium.

Some UEs may be considered machine-type communication (MTC) or evolved or enhanced machine-type communication (eMTC) UEs. MTC and eMTC UEs include, for example, robots, drones, remote devices, sensors, meters, monitors or location tags, among other examples, or combinations thereof, that may communicate with a base station, another device (for example, remote device), or some other entity. A wireless node may provide, for example, connectivity for or to a network (for example, a wide area network such as Internet or a cellular network) via a wired or wireless communication link. Some UEs may be considered Internet-of-Things (IoT) devices, or may be implemented as NB-IoT (narrowband internet of things) devices. Some UEs may be considered a Customer Premises Equipment (CPE). UE 120 may be included inside a housing that houses components of UE 120, such as processor components, or memory components, among other examples, or combinations thereof.

In general, any quantity of wireless networks may be deployed in a given geographic area. Each wireless network may support a particular radio access technology (RAT) and may operate on one or more frequencies or frequency channels. A frequency may also be referred to as a carrier among other examples. Each frequency may support a single RAT in a given geographic area in order to avoid interference between wireless networks of different RATs. In some cases, NR or 5G RAT networks may be deployed.

In some aspects, two or more UEs 120 (for example, shown as UE 120a and UE 120e) may communicate directly with one another using one or more sidelink channels (for example, without using a base station 110 as an intermediary). For example, the UEs 120 may communicate using peer-to-peer (P2P) communications, device-to-device (D2D) communications, a vehicle-to-everything (V2X) protocol (for example, which may include a vehicle-to-vehicle (V2V) protocol, or a vehicle-to-infrastructure (V2I) protocol, among other examples, or combinations thereof), or a mesh network, among other examples, or combinations thereof. In such examples, the UE 120 may perform scheduling operations, resource selection operations, or other operations described elsewhere herein as being performed by the base station 110.

Figure 2:
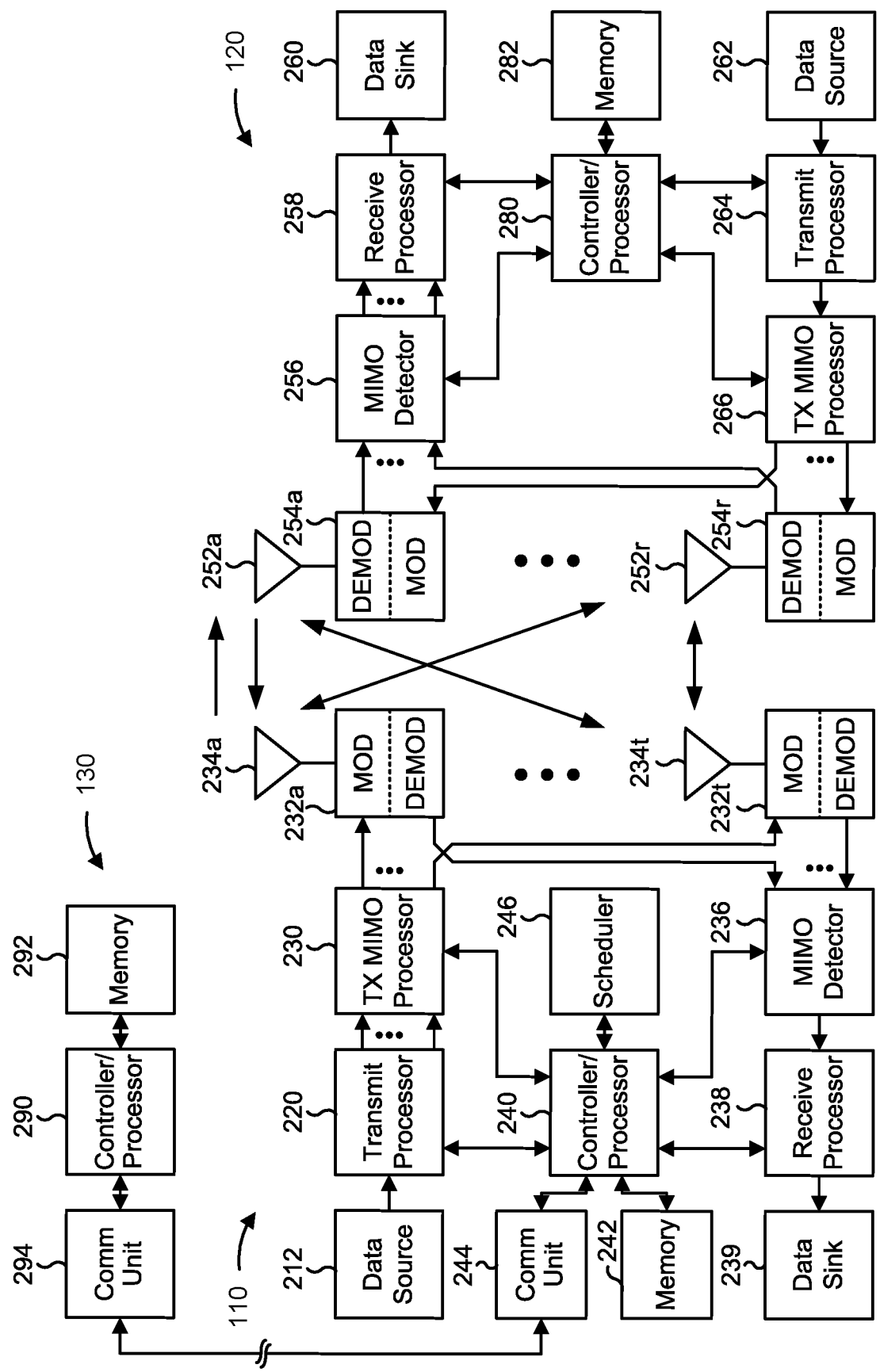
FIG. 2 is a block diagram illustrating an example base station (BS) in communication with a user equipment (UE) in a wireless network, in accordance with various aspects of the present disclosure.

FIG. 2 is a block diagram illustrating an example BS in communication with a UE in a wireless network in accordance with various aspects of the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCSs) for each UE based at least in part on channel quality indicators (CQIs) received from the UE, process (for example, encode) the data for each UE based at least in part on the MCS(s) selected for the UE, and provide data symbols for all UEs. Transmit processor 220 may also process system information (for example, for semi-static resource partitioning information (SRPI) among other examples) and control information (for example, CQI requests, grants, or upper layer signaling, among other examples, or combinations thereof) and provide overhead symbols and control symbols. Transmit processor 220 may also generate reference symbols for reference signals (for example, the cell-specific reference signal (CRS)) and synchronization signals (for example, the primary synchronization signal (PSS) and secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide T output symbol streams to T modulators (MODs) 232a through 232t. Each MOD 232 may process a respective output symbol stream (for example, for OFDM among other examples) to obtain an output sample stream. Each MOD 232 may further process (for example, convert to analog, amplify, filter, and upconvert) the output sample stream to obtain a downlink signal. T downlink signals from MODs 232a through 232t may be transmitted via T antennas 234a through 234t, respectively. In accordance with various aspects described in more detail below, the synchronization signals can be generated with location encoding to convey additional information.

At UE 120, antennas 252a through 252r may receive the downlink signals from base station 110 or other base stations and may provide received signals to R demodulators (DE-MODs) 254a through 254r, respectively. Each DEMOD 254 may condition (for example, filter, amplify, downconvert, and digitize) a received signal to obtain input samples. Each DEMOD 254 may further process the input samples (for example, for OFDM) to obtain received symbols. A MIMO detector 256 may obtain received symbols from all R DEMODs 254a through 254r, perform MIMO detection on the received symbols if applicable, and provide detected symbols. A receive processor 258 may process (for example, decode) the detected symbols, provide decoded data for UE 120 to a data sink 260, and provide decoded control information and system information to a controller/processor 280. A channel processor may determine a reference signal received power (RSRP), a received signal strength indicator (RSSI), a reference signal received quality (RSRQ), or a channel quality indicator (CQI), among other examples, or combinations thereof. In some aspects, one or more components of UE 120 may be included in a housing.

On the uplink, at UE 120, a transmit processor 264 may receive and process data from a data source 262 as well as control information (for example, for transmits including RSRP, RSSI, RSRQ, or CQI, among other examples, or combinations thereof) from controller/processor 280. Transmit processor 264 may also generate reference symbols for one or more reference signals. The symbols from transmit processor 264 may be precoded by a TX MIMO processor 266 if applicable, further processed by MODs 254a through 254r (for example, for discrete Fourier transform spread orthogonal frequency division multiplexing (DFT-s-OFDM), or orthogonal frequency division multiplexing (OFDM) with a cyclic prefix (CP) (CP-OFDM), among other examples, or combinations thereof), and transmitted to base station 110. At base station 110, the uplink signals from UE 120 and other UEs may be received by antennas 234, processed by DEMODs 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, or any other component(s) of FIG. 2 may perform one or more techniques associated with UE-side selection of selected and candidate cells, as described in more detail elsewhere herein. For example, controller/processor 240 of base station 110, controller/processor 280 of UE 120, or any other component(s) of FIG. 2 may perform or direct operations of, for example, the process of FIG. 5, the process of FIG. 6, or other processes as described herein. Memories 242 and 282 may store data and program codes for base station 110 and UE 120, respectively. A scheduler 246 may schedule UEs for data transmission on the downlink or uplink.

Figure 3:
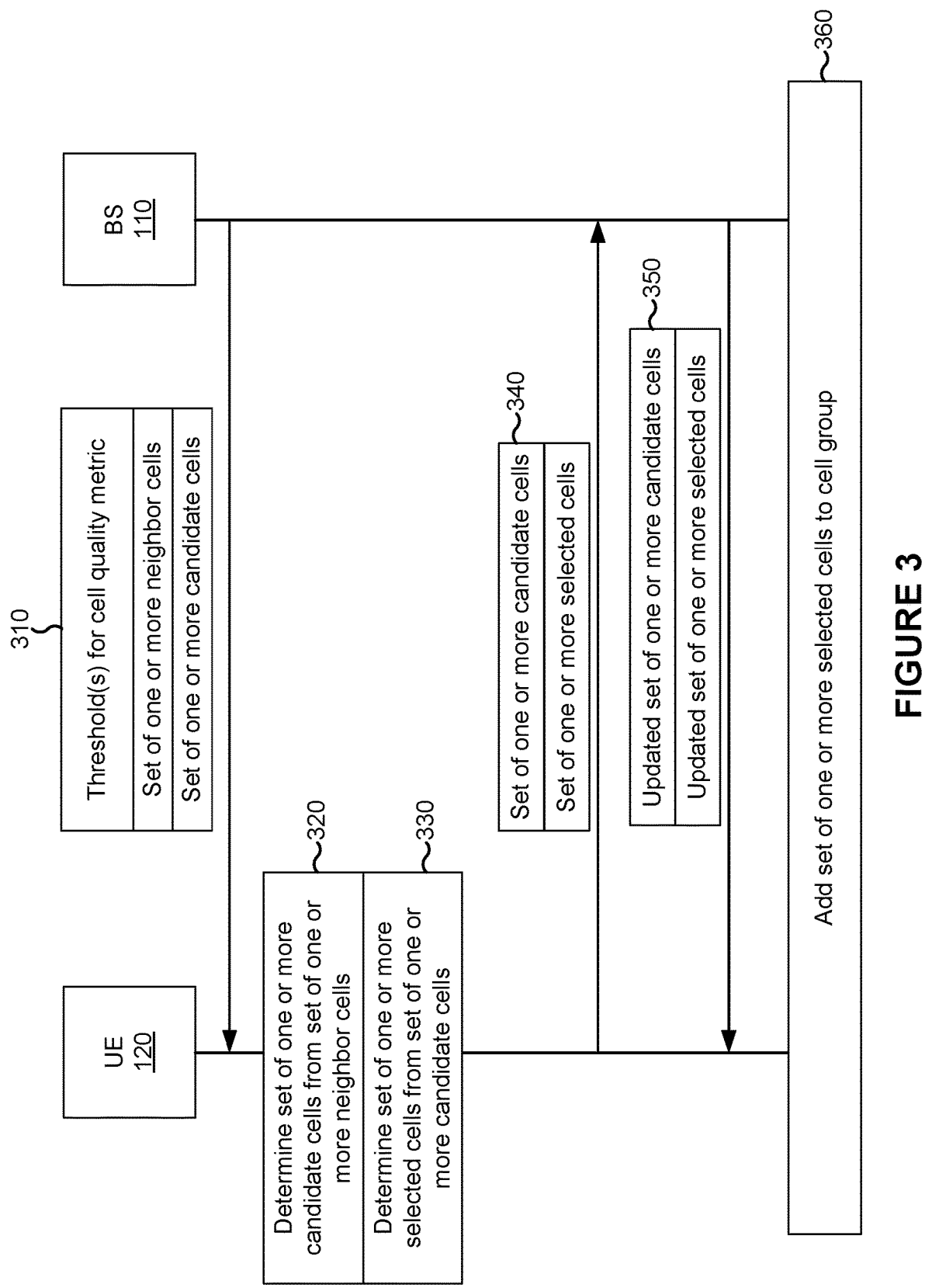
FIG. 3 is an example flow diagram that supports UE-side selection of candidate cells and selected cells, in accordance with various aspects of the present disclosure.

FIG. 3 is an example flow diagram that supports UE-side selection of candidate cells and selected cells, in accordance with various aspects of the present disclosure. As shown, FIG. 3 includes a UE 120 and a BS 110.

As shown in FIG. 3, the BS 110 may transmit information 310 indicating one or more thresholds for a cell quality metric to the UE 120. In some aspects, the information 310 may indicate thresholds for multiple cell quality metrics, and the UE 120 may use the multiple cell quality metrics to select candidate or selected cells. In some aspects, the cell quality metric may be used by the UE 120 to select a set of one or more candidate cells from a set of one or more neighbor cells. A candidate cell is a cell, selected from a neighbor cell or a group of neighbor cells, that is eligible for selection as a serving cell of the UE 120. A selected cell is a cell that has been selected for addition to a cell group as a serving cell (such as a primary cell group or a secondary cell group of a carrier aggregation configuration). In some aspects, the cell quality metric may be used by the UE 120 to select a set of one or more selected cells from the set of one or more candidate cells. In some aspects, the cell quality metric may be a reference signal received power (RSRP). In some aspects, the cell quality metric may be a reference signal received quality (RSRQ). In some aspects, the cell quality metric may be a signal-to-interference-and-noise ratio (SINR). In some aspects, the cell quality metric may be a combination of two or more of RSRP, RSRQ, and SINR.

In some aspects, as shown, the information 310 may indicate a set of one or more neighbor cells. For example, the BS 110 may transmit information indicating a set of one or more neighbor cells from which the set of one or more candidate cells is to be selected, which may conserve computing resources of the UE 120 that would otherwise be used to select or determine the set of one or more neighbor cells. In some other examples, the UE 120 may determine the set of one or more neighbor cells, for example, based at least in part on cell searching by the UE 120. The UE 120's determination of the set of one or more neighbor cells may reduce latency and conserve computing resources of the BS 110.

In some aspects, as shown, the information 310 may indicate a set of one or more candidate cells. For example, the BS 110 may transmit information indicating a set of one or more candidate cells from which the set of one or more selected cells is to be selected, which may conserve computing resources of the UE 120 that would otherwise be used to select or determine the set of one or more candidate cells.

In some aspects, the information 310 may be signaled to the UE 120 using radio resource control (RRC) signaling. In some aspects, the information 310 may be signaled to the UE 120 using MAC signaling, such as using a MAC control element (MAC-CE). In some aspects, the information 310 may be signaled to the UE 120 using downlink control information (DCI).

In some aspects, in an operation 320, the UE 120 may determine the set of one or more candidate cells from the set of one or more neighbor cells. In some aspects, the UE 120 may determine the set of one or more candidate cells, for example, based at least in part on a threshold indicated by the information 310. For example, the UE 120 may determine the cell quality metric based at least in part on a cell quality metric of the top X strongest synchronization signal blocks (SSBs) of a cell, where X is an integer. The UE 120 may select, for the set of one or more candidate cells, one or more cells for which the cell quality metric satisfies the threshold indicated by the information 310. The UE 120's determination of the set of one or more candidate cells may reduce latency and conserve computing resources of the BS 110.

In an operation 330, the UE 120 may determine the set of one or more selected cells from the set of one or more candidate cells. In some aspects, the UE 120 may determine the set of one or more selected cells, for example, based at least in part on a threshold indicated by the information 310. For example, the UE 120 may determine a cell quality metric for the set of one or more candidate cells based at least in part on a cell quality metric of the top X strongest SSBs of a cell, where X is an integer. The UE 120 may select one or more cells for which the cell quality metric satisfies the threshold indicated by the information 310 and select one or more of these cells as the set of one or more selected cells. The UE 120's determination of the set of one or more selected cells may reduce latency and overhead and conserve computing resources of the BS 110.

In some aspects, the set of one or more candidate cells and the set of one or more selected cells may be selected based at least in part on a same cell quality metric. For example, the set of one or more candidate cells and the set of one or more selected cells may be selected in accordance with different thresholds of a same cell quality metric.

As shown, the UE 120 may transmit information 340 indicating the set of one or more candidate cells or the set of one or more selected cells to the BS 110. Examples of signaling for transmitting the information indicating the set of one or more candidate cells or the selected cells are described below in connection with FIG. 4. In some aspects, the UE 120 may transmit the information 340 using RRC signaling. In some aspects, the UE 120 may transmit the information 340 using MAC signaling, such as by using a MAC-CE. In some aspects, the UE 120 may transmit the information 340 using uplink control information (UCI). In some aspects, the UE 120 may transmit the information 340 using a physical uplink control channel (PUCCH). In some aspects, the UE 120 may transmit the information 340 using a physical uplink shared channel (PUSCH). In some aspects, the transmitting of the information 340 may be configured as periodic transmitting, or may be performed periodically. In some aspects, the transmitting of the information 340 may be performed based at least in part on or in response to a triggering event. For example, the triggering event may be a change of a candidate cell or a selected cell of the UE 120. Additionally or alternatively, the operations associated with FIG. 3, such as candidate cell selection or selected cell selection, can be performed periodically or based at least in part on or in response to a triggering event.

In some aspects, the information 340 may indicate corresponding cell identifiers or physical cell identifiers (PCIs) of the set of one or more candidate cells or the set of one or more selected cells. In some aspects, the information 340 may indicate a value of a cell quality metric for a candidate cell or a selected cell. For example, the information 340 may indicate corresponding cell quality metric values for the set of one or more candidate cells or the set of one or more selected cells. In some aspects, the UE 120 may transmit the corresponding cell quality metric values based at least in part on a configuration indicating whether the UE 120 is to transmit the corresponding cell quality metric values. For example, the configuration may be performed by the BS 110 using RRC signaling, a MAC-CE, or DCI.

As shown, in some aspects, the BS 110 may transmit information 350 indicating an updated set of one or more candidate cells or an updated set of one or more selected cells. For example, after receiving the information 340 indicating the set of one or more candidate cells or the set of one or more selected cells, the BS 110 may determine an updated set of one or more candidate cells or an updated set of one or more selected cells, and may transmit the information 350 indicating the updated set of one or more candidate cells or the updated set of one or more selected cells. In some aspects, the BS 110 may transmit the information 350 using RRC signaling. In some aspects, the BS 110 may transmit the information 350 using MAC signaling, such as by using a MAC-CE. In some aspects, the BS 110 may transmit the information 350 using DCI.

In an operation 360, the UE 120 and the BS 110 may add the set of one or more selected cells (such as the set of one or more selected cells selected by the UE 120 or the updated set of one or more selected cells indicated by the base station) to a cell group of the UE 120. The UE 120 may use the cell group as a serving cell. For example, the UE 120 may perform configuration communications, control communications, or other communications (such as data communications) on one or more cells of the cell group.

Figure 4:
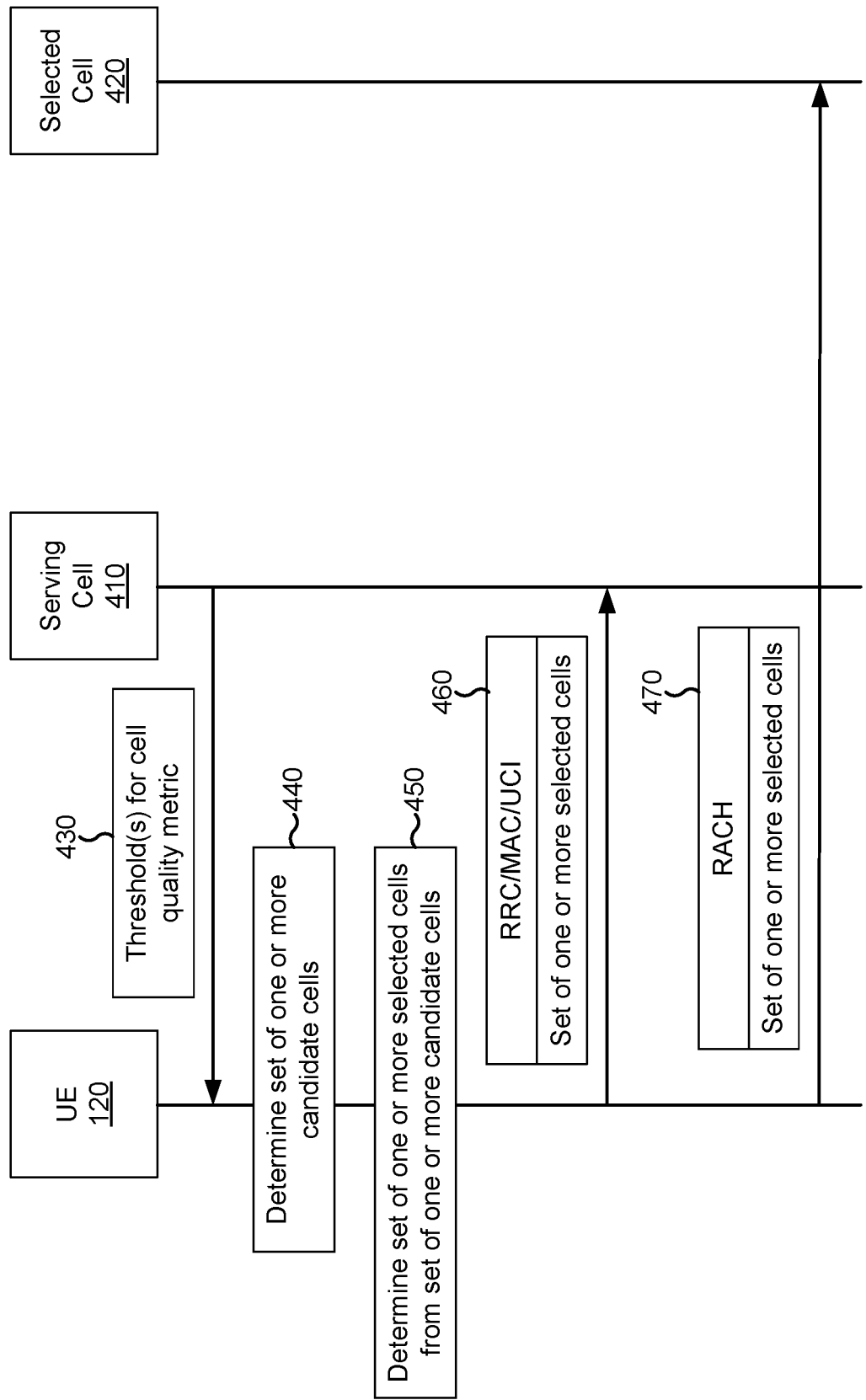
FIG. 4 is an example flow diagram that supports UE-side selection of candidate cells and selected cells, in accordance with various aspects of the present disclosure.

FIG. 4 is an example flow diagram that supports UE-side selection of candidate cells and selected cells, in accordance with various aspects of the present disclosure. As shown, example 400 includes a UE 120, a serving cell 410, and a selected cell 420. The serving cell 410 and the selected cell 420 may be associated with the same base station (such as BS 110) or with different base stations.

As shown in FIG. 4 the serving cell 410 may transmit one or more thresholds 430 for one or more cell quality metrics to the UE 120. In some aspects, the serving cell 410 may transmit other information, such as at least part of the information 310 of FIG. 3.

In an operation 440, the UE 120 may determine a set of one or more candidate cells. In an operation 450, the UE 120 may determine a set of one or more selected cells from the set of one or more candidate cells. The set of one or more selected cells may include the selected cell 420. The selection of the set of one or more candidate cells and the set of one or more selected cells may be performed based at least in part on the one or more thresholds 430 and is described in more detail in connection with FIG. 3.

In an operation 460, in some aspects, the UE 120 may transmit information identifying the set of one or more selected cells to the serving cell 410 (such as a BS 110 associated with the serving cell 410). In some aspects, the UE 120 may transmit information identifying the set of one or more selected cells to the serving cell 410 using RRC signaling. In some aspects, the UE 120 may transmit information identifying the set of one or more selected cells to the serving cell 410 using MAC signaling, such as by using a MAC-CE. In some aspects, the UE 120 may transmit information identifying the set of one or more selected cells to the serving cell 410 using UCI.

In an operation 470, in some aspects, the UE 120 may transmit information identifying the set of one or more selected cells to a selected cell 420 of the set of one or more selected cells (such as a BS 110 associated with the selected cell 420). In some aspects, the UE 120 may transmit information identifying the set of one or more selected cells to the selected cell 420 using random access channel (RACH) signaling such that the UE can transmit information identifying the set of one or more selected cells to the selected cell 420 without having an active connection with the selected cell 420. For example, the UE 120 may perform a RACH procedure with the selected cell 420. The UE 120 may transmit information indicating the set of one or more selected cells using a RACH message, such as RACH Message 1 or RACH Message 3 of a four-step RACH procedure, or RACH Message A of a two-step RACH procedure.

Figure 5:
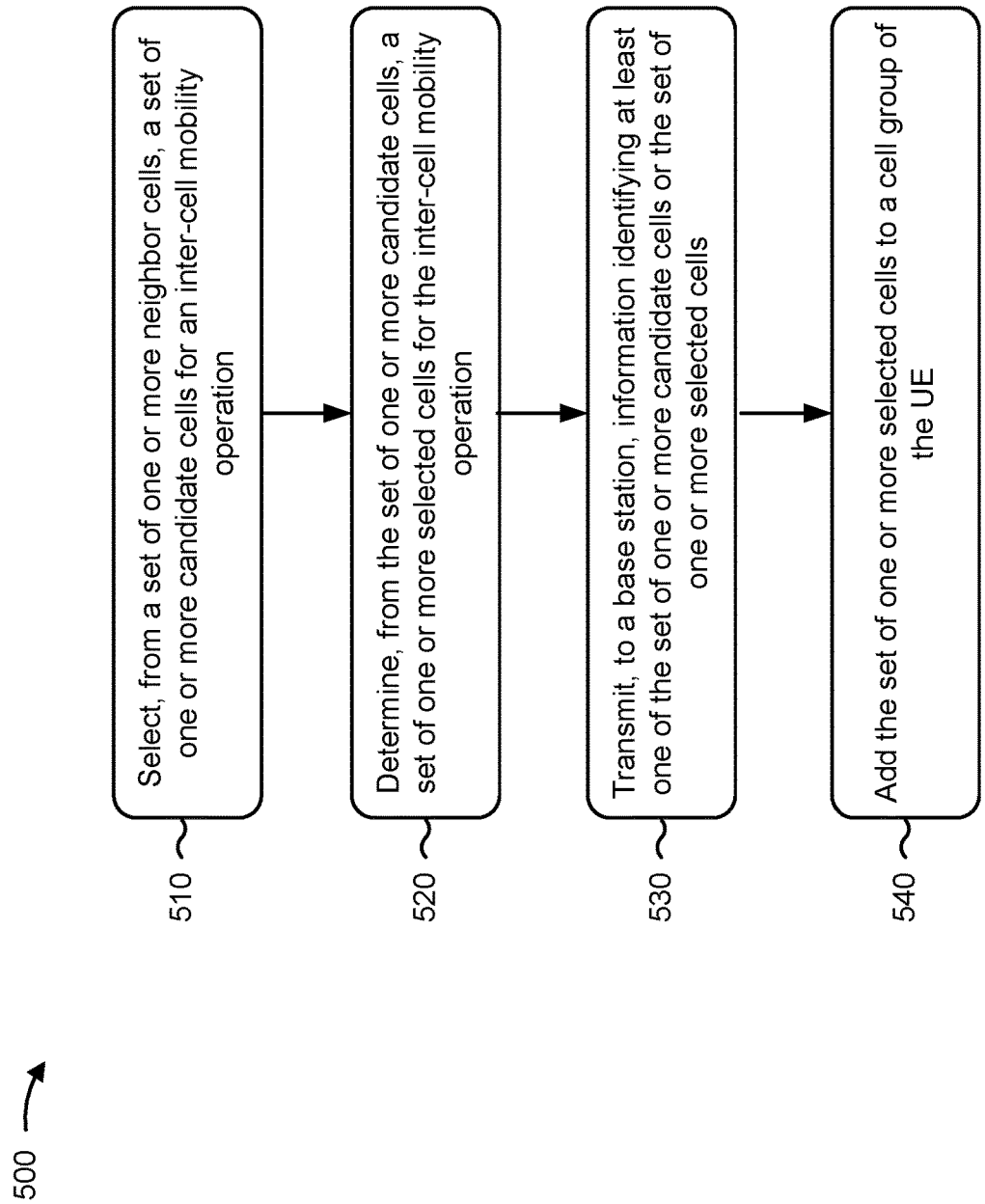
FIG. 5 is a flowchart illustrating an example process performed by a UE, in accordance with various aspects of the present disclosure.

FIG. 5 is a diagram illustrating an example process 500 performed, for example, by a UE, in accordance with various aspects of the present disclosure. In the example process 500, the UE (such as UE 120 or other examples) performs operations associated with UE-side selection of a set of one or more candidate cells and a set of one or more selected cells.

As shown in FIG. 5, in some aspects, the process 500 may include selecting, from a set of one or more neighbor cells, a set of one or more candidate cells for an inter-cell mobility operation (block 510). For example, the UE (such as using antenna 252, DEMOD 254, MIMO detector 256, receive processor 258, controller/processor 280, the selection component 706 of FIG. 7, or other examples) may select, from a set of one or more neighbor cells, a set of one or more candidate cells for an inter-cell mobility operation based at least in part on one or more thresholds for one or more quality metrics, as described above with respect to FIGS. 3 and 4.

As further shown in FIG. 5, in some aspects, the process 500 may include determining, from the set of one or more candidate cells, a set of one or more selected cells for the inter-cell mobility operation (block 520). For example, the UE (such as using antenna 252, DEMOD 254, MIMO detector 256, receive processor 258, controller/processor 280, the determination component 710 or selection component 706 of FIG. 7, or other examples) may determine, from the set of one or more candidate cells, a set of one or more selected cells for the inter-cell mobility operation, as described above with respect to FIGS. 3 and 4. The UE may determine the set of one or more selected cells using one or more thresholds for one or more quality metrics, which may be the same as or different than the one or more quality metrics described in connection with block 510.

As further shown in FIG. 5, in some aspects, the process 500 may include transmitting, to a base station, at least one of the set of one or more candidate cells or the set of one or more selected cells (block 530). For example, the UE (such as using controller/processor 280, transmit processor 264, TX MIMO processor 266, MOD 254, antenna 252, reporting component 712, or other examples) may transmit, to a base station, at least one of the set of one or more candidate cells or the set of one or more selected cells, as described above with respect to FIGS. 3 and 4. For example, the UE may transmit the at least one of the set of one or more candidate cells or the set of one or more selected cells using RRC signaling, a MAC-CE, UCI, or a similar signaling technique.

As further shown in FIG. 5, in some aspects, the process 500 may include adding the set of one or more selected cells to a cell group of the UE (block 540). For example, the UE (such as using controller/processor 280, transmit processor 264, TX MIMO processor 266, MOD 254, antenna 252, addition component 708, or other examples) may add the set of one or more selected cells to a cell group of the UE, as described above with respect to FIGS. 3 and 4. The UE may use one or more cells of cell group as one or more serving cells.

The process may include additional aspects, such as any single aspect or any combination of aspects described below or in connection with one or more other processes described elsewhere herein.

In a first additional aspect, the set of one or more neighbor cells is configured by the base station.

In a second additional aspect, alone or in combination with the first additional aspect, the process 500 includes identifying the set of one or more neighbor cells based at least in part on a cell search.

In a third additional aspect, alone or in combination with one or more of the first and second additional aspects, the process 500 includes receiving a threshold for a cell quality metric from the base station; determining a value of the cell quality metric; and selecting the set of one or more candidate cells based at least in part on the threshold and the value.

In a fourth additional aspect, alone or in combination with one or more of the first through third additional aspects, the cell quality metric includes at least one of a reference signal received power, a reference signal received quality, or a signal-to-interference-plus-noise ratio.

In a fifth additional aspect, alone or in combination with one or more of the first through fourth additional aspects, the threshold for the cell quality metric is signaled to the UE via at least one of radio resource control signaling, a medium access control control element, or downlink control information.

In a sixth additional aspect, alone or in combination with one or more of the first through fifth additional aspects, the determination of the cell quality metric is based at least in part on a set of strongest synchronization signal blocks of the cell.

In a seventh additional aspect, alone or in combination with one or more of the first through sixth additional aspects, determining the set of one or more selected cells further includes determining the set of one or more selected cells based at least in part on the threshold.

In an eighth additional aspect, alone or in combination with one or more of the first through seventh additional aspects, the cell quality metric includes at least one of a reference signal received power, a reference signal received quality, or a signal-to-interference-plus-noise ratio.

In a ninth additional aspect, alone or in combination with one or more of the first through eighth additional aspects, the threshold for the cell quality metric is signaled to the UE via at least one of radio resource control signaling, a medium access control control element, or downlink control information.

In a tenth additional aspect, alone or in combination with one or more of the first through ninth additional aspects, for a cell, the cell quality metric is determined based at least in part on a set of strongest synchronization signal blocks of the cell.

In an eleventh additional aspect, alone or in combination with one or more of the first through tenth additional aspects, determining the set of one or more selected cells further includes determining the set of one or more selected cells based at least in part on the information indicating the set of one or more candidate cells.

In a twelfth additional aspect, alone or in combination with one or more of the first through eleventh additional aspects, transmitting information identifying at least one of the set of one or more candidate cells or the set of one or more selected cells to the base station includes transmitting information identifying at least one of the set of one or more candidate cells or the set of one or more selected cells via a current selected cell of the UE.

In a thirteenth additional aspect, alone or in combination with one or more of the first through twelfth additional aspects, transmitting information identifying at least one of the set of one or more candidate cells or the set of one or more selected cells to the base station includes transmitting information identifying at least one of the set of one or more candidate cells or the set of one or more selected cells via one or more selected cells of the set of one or more selected cells.

In a fourteenth additional aspect, alone or in combination with one or more of the first through thirteenth additional aspects, transmitting information identifying at least one of the set of one or more candidate cells or the set of one or more selected cells to the base station includes transmitting information identifying at least one of the set of one or more candidate cells or the set of one or more selected cells via the set of one or more selected cells using an uplink message of a random access channel procedure on the set of one or more selected cells.

In a fifteenth additional aspect, alone or in combination with one or more of the first through fourteenth additional aspects, the set of one or more candidate cells or the set of one or more selected cells are transmitted to the base station via at least one of radio resource control signaling, a medium access control control element, or uplink control information.

In a sixteenth additional aspect, alone or in combination with one or more of the first through fifteenth additional aspects, the uplink control information is transmitted via at least one of a physical uplink control channel or a physical uplink shared channel.

In a seventeenth additional aspect, alone or in combination with one or more of the first through sixteenth additional aspects, the set of one or more candidate cells or the set of one or more selected cells are transmitted to the base station based at least in part on cell identifiers or physical cell identifiers associated with the set of one or more candidate cells or the set of one or more selected cells.

In an eighteenth additional aspect, alone or in combination with one or more of the first through seventeenth additional aspects, a cell quality metric associated with one or more cells, of the set of one or more candidate cells and the set of one or more selected cells, is transmitted for the one or more cells.

In a nineteenth additional aspect, alone or in combination with one or more of the first through eighteenth additional aspects, the process 500 further includes receiving information indicating whether to transmit a cell quality metric associated with one or more cells of the set of one or more candidate cells and the set of one or more selected cells; and selectively transmitting the cell quality metric in accordance with the information indicating whether to transmit the cell quality metric.

In a twentieth additional aspect, alone or in combination with one or more of the first through nineteenth additional aspects, the information indicating whether to transmit the cell quality metric is received via at least one of radio resource control signaling, a medium access control control element, or downlink control information.

In a twenty-first additional aspect, alone or in combination with one or more of the first through twentieth additional aspects, transmitting at least one of the set of one or more candidate cells or the set of one or more selected cells includes transmitting at least one of the set of one or more candidate cells or the set of one or more selected cells based at least in part on a periodic transmitting configuration.

In a twenty-second additional aspect, alone or in combination with one or more of the first through twenty-first additional aspects, transmitting at least one of the set of one or more candidate cells or the set of one or more selected cells further includes transmitting at least one of the set of one or more candidate cells or the set of one or more selected cells based at least in part on a triggering event.

In a twenty-third additional aspect, alone or in combination with one or more of the first through twenty-second additional aspects, the triggering event is a change of a candidate cell or a selected cell of the UE.

In a twenty-fourth additional aspect, alone or in combination with one or more of the first through twenty-third additional aspects, the process 500 further includes receiving, from the base station, at least one of: information indicating an updated set of one or more candidate cells, or information indicating an updated set of one or more selected cells.

In a twenty-fifth additional aspect, alone or in combination with one or more of the first through twenty-fourth additional aspects, the information indicating the updated set of one or more candidate cells or the information indicating the updated set of one or more selected cells is received via at least one of radio resource control signaling, a medium access control control element, or downlink control information.

Figure 6:
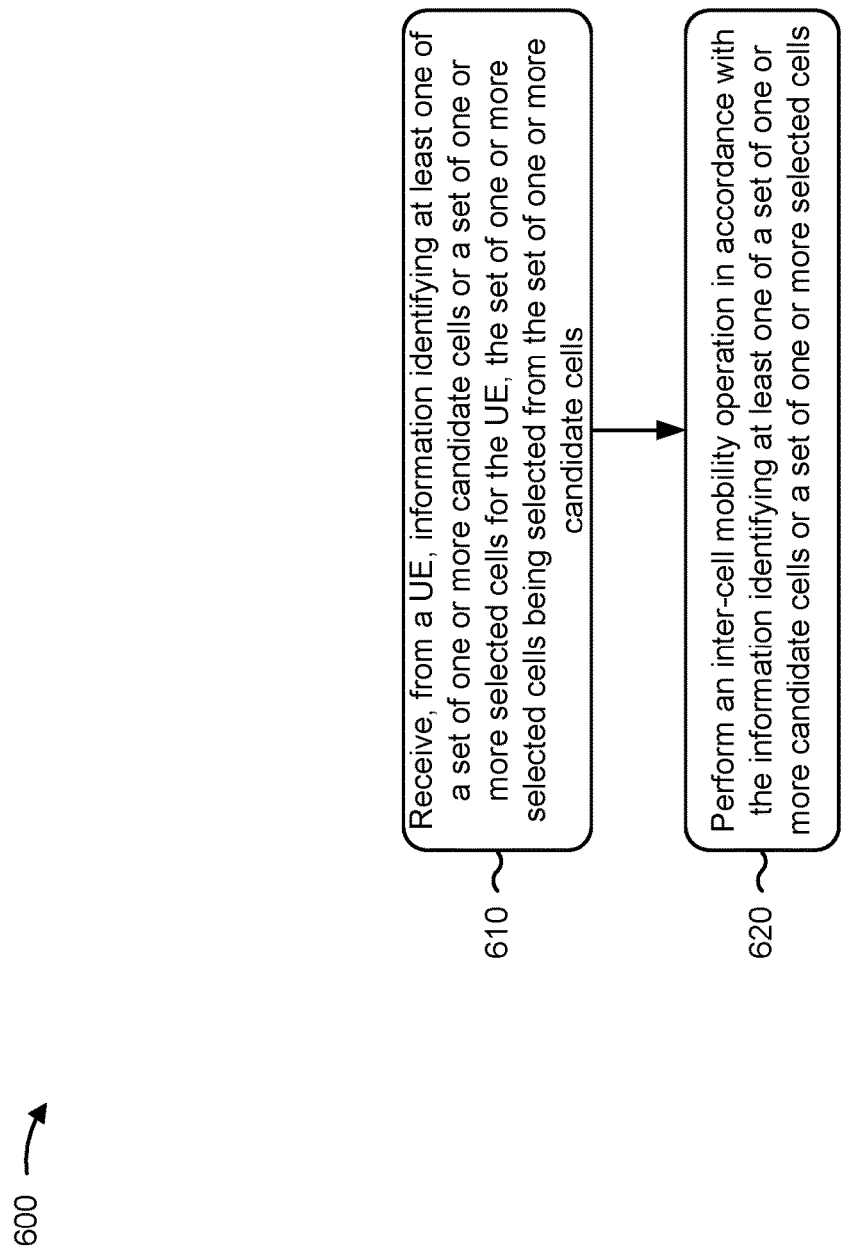
FIG. 6 is a flowchart illustrating an example process performed by a UE, in accordance with various aspects of the present disclosure.

FIG. 6 is a diagram illustrating an example process 600 performed, for example, by a BS, in accordance with various aspects of the present disclosure. In the example process 600, the BS (such as BS 110 or other examples) performs operations associated with UE-side selection of a set of one or more selected cells and a set of one or more candidate cells.

As shown in FIG. 6, in some aspects, the process 600 may include receiving, from a UE, information identifying at least one of a set of one or more candidate cells or a set of one or more selected cells for the UE, the set of one or more selected cells being selected from the set of one or more candidate cells (block 610). For example, the BS (such as using antenna 234, DEMOD 232, MIMO detector 236, receive processor 238, controller/processor 240, reception component 804 of FIG. 8, or other examples) may receive, from a UE, information identifying at least one of a set of one or more candidate cells or a set of one or more selected cells for the UE, the set of one or more selected cells being selected from the set of one or more candidate cells, as described above with respect to FIGS. 3 and 4. The BS may receive the information using RRC signaling, a MAC-CE, UCI, or a similar messaging technique.

As further shown in FIG. 6, in some aspects, the process 600 may include performing an inter-cell mobility operation in accordance with the information identifying at least one of a set of one or more candidate cells or a set of one or more selected cells (block 620). For example, the BS (such as using controller/processor 240, transmit processor 220, TX MIMO processor 230, MOD 232, antenna 234, mobility component 806, or other examples) may perform an inter-cell mobility operation in accordance with the information identifying at least one of a set of one or more candidate cells or a set of one or more selected cells, as described above with respect to FIGS. 3 and 4. The inter-cell mobility operation may include setting up a selected cell as a serving cell, adding the set of one or more selected cells to a cell group of the UE, or another operation associated with inter-cell mobility.

The process 600 may include additional aspects, such as any single aspect or any combination of aspects described below or in connection with one or more other processes described elsewhere herein.

In a first additional aspect, the set of one or more candidate cells is selected from the set of one or more neighbor cells.

In a second additional aspect, alone or in combination with the first additional aspect, the process 600 includes configuring, for the UE, a threshold for a cell quality metric for selecting the set of one or more candidate cells.

In a third additional aspect, alone or in combination with one or more of the first and second additional aspects, the cell quality metric includes at least one of a reference signal received power, a reference signal received quality, or a signal-to-interference-plus-noise ratio.

In a fourth additional aspect, alone or in combination with one or more of the first through third additional aspects, the threshold for the cell quality metric is signaled to the UE via at least one of radio resource control signaling, a medium access control control element, or downlink control information.

In a fifth additional aspect, alone or in combination with one or more of the first through fourth additional aspects, for a particular cell, the cell quality metric is determined based at least in part on a set of strongest synchronization signal blocks of the particular cell.

In a sixth additional aspect, alone or in combination with one or more of the first through fifth additional aspects, the process 600 includes configuring, for the UE, a threshold for a cell quality metric for determining the set of one or more selected cells.

In a seventh additional aspect, alone or in combination with one or more of the first through sixth additional aspects, the cell quality metric includes at least one of a reference signal received power, a reference signal received quality, or a signal-to-interference-plus-noise ratio.

In an eighth additional aspect, alone or in combination with one or more of the first through seventh additional aspects, the threshold for the cell quality metric is signaled to the UE via at least one of radio resource control signaling, a medium access control control element, or downlink control information.

In a ninth additional aspect, alone or in combination with one or more of the first through eighth additional aspects, for a particular cell, the cell quality metric is determined based at least in part on a set of strongest synchronization signal blocks of the particular cell.

In a tenth additional aspect, alone or in combination with one or more of the first through ninth additional aspects, the process 600 includes providing, to the UE, information indicating the set of one or more candidate cells.

In an eleventh additional aspect, alone or in combination with one or more of the first through tenth additional aspects, the information identifying at least one of the set of one or more candidate cells or the set of one or more selected cells is received via a current selected cell of the UE.

In a twelfth additional aspect, alone or in combination with one or more of the first through eleventh additional aspects, the information identifying at least one of the set of one or more candidate cells or the set of one or more selected cells is received via one or more selected cells of the set of one or more selected cells.

In a thirteenth additional aspect, alone or in combination with one or more of the first through twelfth additional aspects, the information identifying at least one of the set of one or more candidate cells or the set of one or more selected cells is received via the set of one or more selected cells using an uplink message of a random access channel procedure on the set of one or more selected cells.

In a fourteenth additional aspect, alone or in combination with one or more of the first through thirteenth additional aspects, the information identifying at least one of the set of one or more candidate cells or the set of one or more selected cells is received via at least one of radio resource control signaling, a medium access control control element, or uplink control information.

In a fifteenth additional aspect, alone or in combination with one or more of the first through fourteenth additional aspects, the uplink control information is received via at least one of a physical uplink control channel or a physical uplink shared channel.

In a sixteenth additional aspect, alone or in combination with one or more of the first through fifteenth additional aspects, the information identifying at least one of the set of one or more candidate cells or the set of one or more selected cells indicates cell identifiers or physical cell identifiers associated with the set of one or more candidate cells or the set of one or more selected cells.

In a seventeenth additional aspect, alone or in combination with one or more of the first through sixteenth additional aspects, the information identifying at least one of the set of one or more candidate cells or the set of one or more selected cells indicates a cell quality metric associated with one or more cells of the set of one or more candidate cells and the set of one or more selected cells.

In an eighteenth additional aspect, alone or in combination with one or more of the first through seventeenth additional aspects, the process 600 includes transmitting, to the UE, information indicating whether to transmit a cell quality metric associated with one or more cells of the set of one or more candidate cells and the set of one or more selected cells; and selectively receiving the cell quality metric in accordance with the information indicating whether to transmit the cell quality metric.

In a nineteenth additional aspect, alone or in combination with one or more of the first through eighteenth additional aspects, the information indicating whether to transmit the cell quality metric is transmitted via at least one of radio resource control signaling, a medium access control control element, or downlink control information.

In a twentieth additional aspect, alone or in combination with one or more of the first through nineteenth additional aspects, receiving information identifying at least one of the set of one or more candidate cells or the set of one or more selected cells is based at least in part on a periodic transmitting configuration.

In a twenty-first additional aspect, alone or in combination with one or more of the first through twentieth additional aspects, receiving information identifying at least one of the set of one or more candidate cells or the set of one or more selected cells is based at least in part on a triggering event.

In a twenty-second additional aspect, alone or in combination with one or more of the first through twenty-first additional aspects, the triggering event is a change of a candidate cell or a selected cell of the UE.

In a twenty-third additional aspect, alone or in combination with one or more of the first through twenty-second additional aspects, the process 600 includes determining at least one of: information indicating an updated set of one or more candidate cells, or information indicating an updated set of one or more selected cells; and providing at least one of the information indicating the updated set of one or more candidate cells or the information indicating the updated set of one or more selected cells to the UE.

In a twenty-fourth additional aspect, alone or in combination with one or more of the first through twenty-third additional aspects, the information indicating the updated set of one or more candidate cells or the information indicating the updated set of one or more selected cells is transmitted via at least one of radio resource control signaling, a medium access control control element, or downlink control information.

Figure 7:
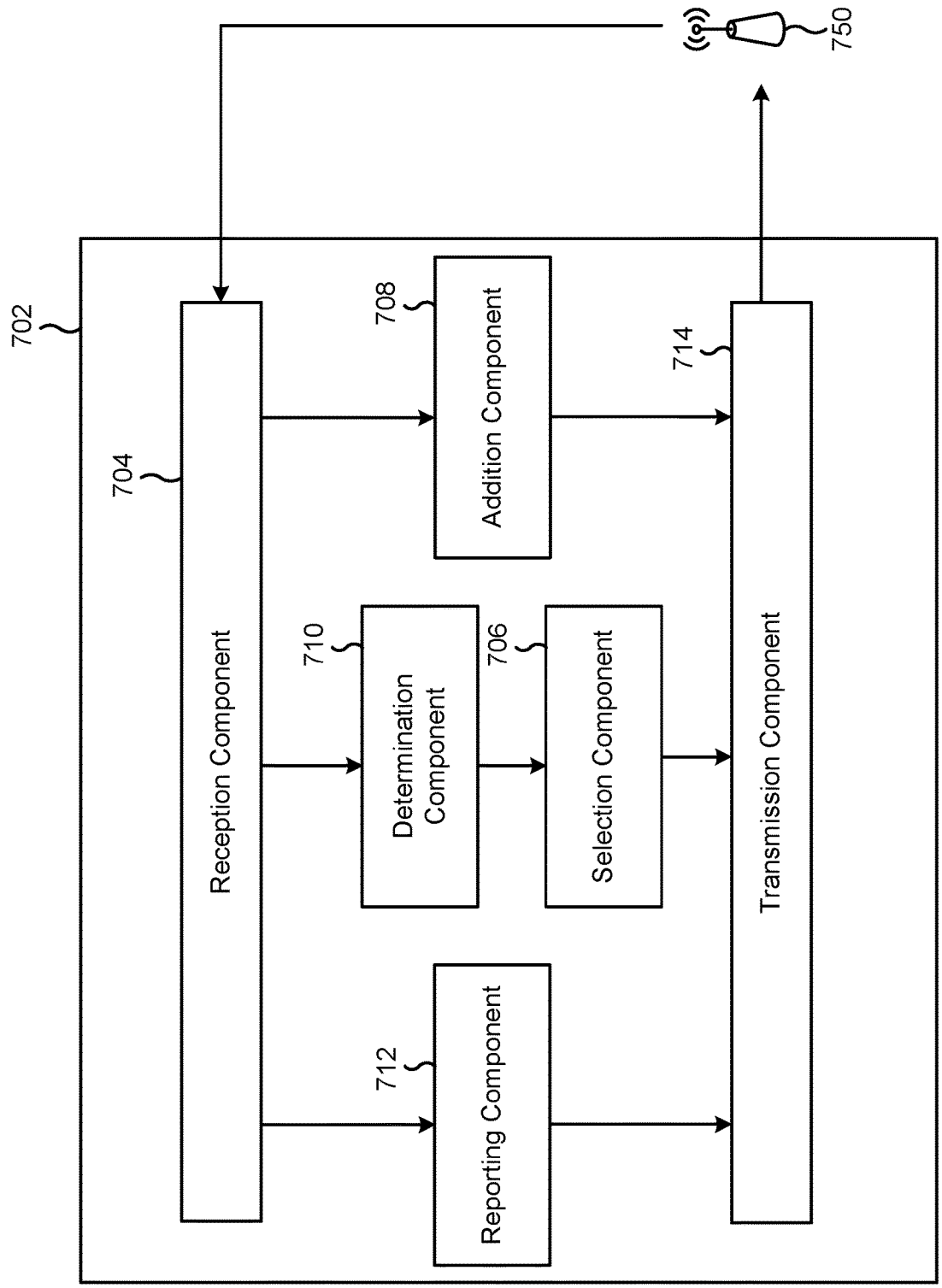
FIG. 7 is a block diagram of an example wireless communication device that supports UE-side selection of candidate cells and selected cells, in accordance with various aspects of the present disclosure.

FIG. 7 is a block diagram of an example wireless communication device 702 that supports UE-side selection of candidate cells and selected cells, in accordance with various aspects of the present disclosure. The wireless communication device 702 may be a UE. Alternatively, a UE may include the wireless communication device 702. In some aspects, the wireless communication device 702 includes a reception component 704, a selection component 706, an addition component 708, a determination component 710, a reporting component 712, and a transmission component 714.

The reception component 704 may receive a threshold for a cell quality metric, information indicating a set of one or more candidate cells, information indicating whether to transmit a cell quality metric associated with one or more cells of the set of one or more candidate cells and the set of one or more selected cells, information indicating an updated set of one or more candidate cells, or information indicating an updated set of one or more selected cells.

The selection component 706 may select, from a set of one or more neighbor cells, a set of one or more candidate cells for an inter-cell mobility operation. The selection component 706 may select the set of one or more candidate cells based at least in part on a threshold received by the reception component 704 for a cell quality metric and a value of the cell quality metric determined by the determination component 710. The determination component 710 may determine, from the set of one or more candidate cells selected by the selection component 706, a set of one or more selected cells for the inter-cell mobility operation based on the same or a different threshold and the same or a different cell quality metric. The addition component 708 may add a set of one or more selected cells, selected by the determination component 710, to a cell group of the wireless communication device 702.

The determination component 710 may determine a value of one or more cell quality metrics in order to determine whether the one or more thresholds described above are satisfied.

The reporting component 712 may transmit, to a base station 750, at least one of the set of one or more candidate cells or the set of one or more selected cells. The reporting component 712 also may selectively transmit a cell quality metric in accordance with the information indicating whether to transmit the cell quality metric received by the reception component 704.

The transmission component 714 may transmit information to the base station 750, such as the information generated by the reporting component 712.

The reception component 704 may be implemented using one or more of antenna 252, DEMOD 254, MIMO detector 256, receive processor 258, or controller/processor 280. The selection component 706 may be implemented using one or more of using antenna 252, DEMOD 254, MIMO detector 256, receive processor 258, or controller/processor 280. The addition component 708 may be implemented using one or more of controller/processor 280, transmit processor 264, TX MIMO processor 266, MOD 254, or antenna 252. The determination component 710 may be implemented using controller/processor 280 or receive processor 258. The reporting component 712 may be implemented using one or more of controller/processor 280, transmit processor 264, TX MIMO processor 266, MOD 254, or antenna 252. The transmission component 714 may be implemented using one or more of controller/processor 280, transmit processor 264, TX MIMO processor 266, MOD 254, or antenna 252.

The apparatus may include additional components that perform each of the blocks of the algorithm in the aforementioned method of FIG. 5. Each block in the aforementioned method of FIG. 5 may be performed by a component and the wireless communication device may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 8:
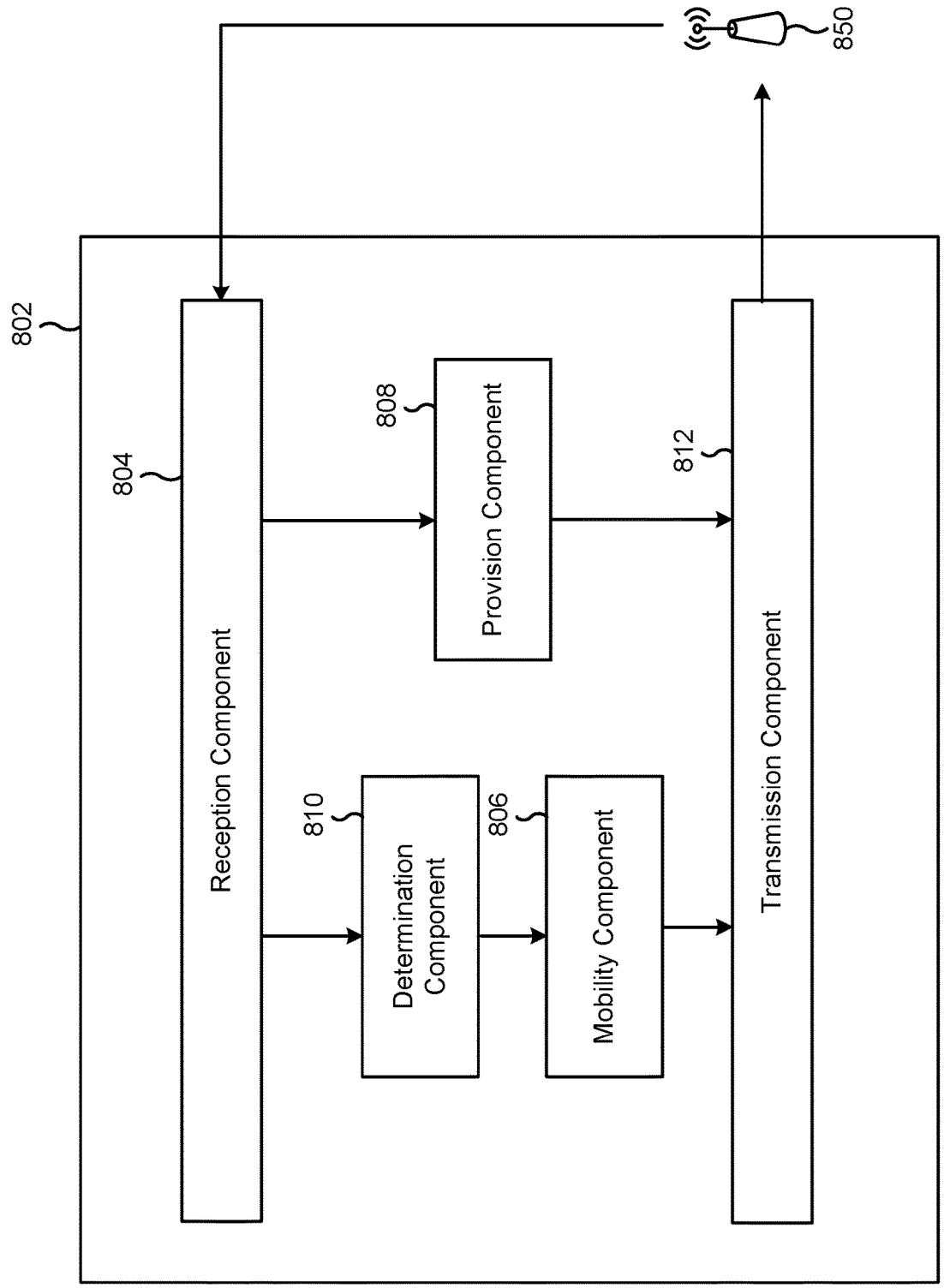
FIG. 8 is a block diagram of an example wireless communication device that supports UE-side selection of candidate cells and selected cells, in accordance with various aspects of the present disclosure.

FIG. 8 is a block diagram of an example wireless communication device 802 that supports UE-side selection of candidate cells and selected cells, in accordance with various aspects of the present disclosure. The wireless communication device 802 may be a base station. Alternatively, a base station may include the wireless communication device 802. In some aspects, the wireless communication device 802 includes a reception component 804, a mobility component 806, a provision component 808, a determination component 810, and a transmission component 812.

The reception component 804 may receive, from a UE 850, information identifying at least one of a set of one or more candidate cells or a set of one or more selected cells for the UE 850, the set of one or more selected cells being selected from the set of one or more candidate cells. The mobility component 806 may perform an inter-cell mobility operation in accordance with the information identifying at least one of a set of one or more candidate cells or a set of one or more selected cells received from the UE 850 by the reception component 804.

The reception component 804 may receive a cell quality metric in accordance with information indicating whether to transmit the cell quality metric transmitted to the UE 850 by the transmission component 812.

The determination component 810 may determine at least one of information indicating an updated set of one or more candidate cells, or information indicating an updated set of one or more selected cells.

The provision component 808 may transmit information, determined by the determination component 810, indicating an updated set of one or more candidate cells or the updated set of one or more selected cells to the UE 850.

The transmission component 812 may transmit, to the UE 850, information indicating whether to transmit a cell quality metric associated with one or more cells of the set of one or more candidate cells and the set of one or more selected cells.

The reception component 804 may be implemented using one or more of antenna 234, DEMOD 232, MIMO detector 236, receive processor 238, or controller/processor 240. The mobility component 806 may be implemented using one or more of controller/processor 240, transmit processor 220, TX MIMO processor 230, MOD 232, or antenna 234. The provision component 808 may be implemented using one or more of controller/processor 240, transmit processor 220, TX MIMO processor 230, MOD 232, or antenna 234. The determination component 810 may be implemented using one or more of control/processor 240 or receive processor 238. The transmission component 812 may be implemented using one or more of controller/processor 240, transmit processor 220, TX MIMO processor 230, MOD 232, or antenna 234.

The wireless communication device may include additional components that perform each of the blocks of the algorithm in the aforementioned method of FIG. 6. Each block in the aforementioned method of FIG. 6 may be performed by a component, and the wireless communication device may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

The following provides an overview of some aspects of the present disclosure:

Aspect 1: A method of wireless communication performed by a user equipment (UE), comprising: selecting, from a set of one or more neighbor cells, a set of one or more candidate cells for an inter-cell mobility operation; determining, from the set of one or more candidate cells, a set of one or more selected cells for the inter-cell mobility operation; transmitting, to a base station, at least one of: the set of one or more candidate cells, or the set of one or more selected cells; and adding the set of one or more selected cells to a cell group of the UE.

Aspect 2: The method of aspect 1, where the set of one or more neighbor cells is configured by the base station.

Aspect 3: The method of aspect 1, further comprising identifying the set of one or more neighbor cells based at least in part on a cell search.

Aspect 4: The method of any of aspects 1-2, further comprising: receiving a threshold for a cell quality metric from the base station; determining a value of the cell quality metric; and selecting the set of one or more candidate cells based at least in part on the threshold and the value.

Aspect 5: The method of aspect 4, where the cell quality metric includes at least one of: a reference signal received power, a reference signal received quality, or a signal-to-interference-plus-noise ratio.

Aspect 6: The method of aspect 4, where the threshold for the cell quality metric is signaled to the UE via at least one of: radio resource control signaling, a medium access control control element, or downlink control information.

Aspect 7: The method of aspect 4, where the determination of the cell quality metric is based at least in part on a set of strongest synchronization signal blocks of the cell.

Aspect 8: The method of any of aspects 1-7, further comprising: receiving, from the base station, a threshold for a cell quality metric; and where determining the set of one or more selected cells further comprises determining the set of one or more selected cells based at least in part on the threshold.

Aspect 9: The method of aspect 8, where the cell quality metric includes at least one of: a reference signal received power, a reference signal received quality, or a signal-to-interference-plus-noise ratio.

Aspect 10: The method of aspect 8, where the threshold for the cell quality metric is signaled to the UE via at least one of: radio resource control signaling, a medium access control control element, or downlink control information.

Aspect 11: The method of aspect 8, where, for a cell, the cell quality metric is determined based at least in part on a set of strongest synchronization signal blocks of the cell.

Aspect 12: The method of any of aspects 1-11, further comprising: receiving information indicating the set of one or more candidate cells, where selecting the set of one or more candidate cells is based at least in part on the information indicating the set of one or more candidate cells; and where determining the set of one or more selected cells further comprises determining the set of one or more selected cells based at least in part on the information indicating the set of one or more candidate cells. where determining the set of one or more selected cells further comprises determining the set of one or more selected cells based at least in part on the information indicating the set of one or more candidate cells.

Aspect 13: The method of any of aspects 1-12, where transmitting information identifying at least one of the set of one or more candidate cells or the set of one or more selected cells to the base station comprises transmitting information identifying at least one of the set of one or more candidate cells or the set of one or more selected cells via a current selected cell of the UE.

Aspect 14: The method of any of aspects 1-12, where transmitting information identifying at least one of the set of one or more candidate cells or the set of one or more selected cells to the base station comprises transmitting information identifying at least one of the set of one or more candidate cells or the set of one or more selected cells via one or more selected cells of the set of one or more selected cells.

Aspect 15: The method of aspect 14, where transmitting information identifying at least one of the set of one or more candidate cells or the set of one or more selected cells to the base station comprises transmitting information identifying at least one of the set of one or more candidate cells or the set of one or more selected cells via the set of one or more selected cells using an uplink message of a random access channel procedure on the set of one or more selected cells.

Aspect 16: The method of any of aspects 1-15, where the set of one or more candidate cells or the set of one or more selected cells are transmitted to the base station via at least one of: radio resource control signaling, a medium access control control element, or uplink control information.

Aspect 17: The method of aspect 16, where the uplink control information is transmitted via at least one of a physical uplink control channel or a physical uplink shared channel.

Aspect 18: The method of any of aspects 1-17, where the set of one or more candidate cells or the set of one or more selected cells are transmitted to the base station based at least in part on cell identifiers or physical cell identifiers associated with the set of one or more candidate cells or the set of one or more selected cells.

Aspect 19: The method of any of aspects 1-18, where a cell quality metric associated with one or more cells, of the set of one or more candidate cells and the set of one or more selected cells, is transmitted for the one or more cells.

Aspect 20: The method of any of aspects 1-19, further comprising: receiving information indicating whether to transmit a cell quality metric associated with one or more cells of the set of one or more candidate cells and the set of one or more selected cells; and selectively transmitting the cell quality metric in accordance with the information indicating whether to transmit the cell quality metric.

Aspect 21: The method of aspect 20, where the information indicating whether to transmit the cell quality metric is received via at least one of: radio resource control signaling, a medium access control control element, or downlink control information.

Aspect 22: The method of any of aspects 1-21, where transmitting at least one of the set of one or more candidate cells or the set of one or more selected cells comprises transmitting at least one of the set of one or more candidate cells or the set of one or more selected cells based at least in part on a periodic transmitting configuration.

Aspect 23: The method of any of aspects 1-21, where transmitting at least one of the set of one or more candidate cells or the set of one or more selected cells further comprises transmitting at least one of the set of one or more candidate cells or the set of one or more selected cells based at least in part on a triggering event.

Aspect 24: The method of aspect 23, where the triggering event is a change of a candidate cell or a selected cell of the UE.

Aspect 25: The method of any of aspects 1-24, further comprising: receiving, from the base station, at least one of: information indicating an updated set of one or more candidate cells, or information indicating an updated set of one or more selected cells.

Aspect 26: The method of aspect 25, where the information indicating the updated set of one or more candidate cells or the information indicating the updated set of one or more selected cells is received via at least one of: radio resource control signaling, a medium access control control element, or downlink control information.

Aspect 27: A method of wireless communication performed by a base station, comprising: receiving, from a user equipment (UE), information identifying at least one of a set of one or more candidate cells or a set of one or more selected cells for the UE, the set of one or more selected cells being selected from the set of one or more candidate cells; and performing an inter-cell mobility operation in accordance with the information identifying at least one of a set of one or more candidate cells or a set of one or more selected cells.

Aspect 28: The method of aspect 27, further comprising configuring a set of one or more neighbor cells for the UE, where the set of one or more candidate cells is selected from the set of one or more neighbor cells.

Aspect 29: The method of aspect 27, further comprising configuring, for the UE, a threshold for a cell quality metric for selecting the set of one or more candidate cells.

Aspect 30: The method of aspect 29, where the cell quality metric includes at least one of: a reference signal received power, a reference signal received quality, or a signal-to-interference-plus-noise value.

Aspect 31: The method of aspect 29, where the threshold for the cell quality metric is signaled to the UE via at least one of: radio resource control signaling, a medium access control control element, or downlink control information.

Aspect 32: The method of aspect 29, where, for a particular cell, the cell quality metric is determined based at least in part on a set of strongest synchronization signal blocks of the particular cell.

Aspect 33: The method of any of aspects 27-32, further comprising configuring, for the UE, a threshold for a cell quality metric for determining the set of one or more selected cells.

Aspect 34: The method of aspect 33, where the cell quality metric includes at least one of: a reference signal received power, a reference signal received quality, or a signal-to-interference-plus-noise ratio.

Aspect 35: The method of aspect 33, where the threshold for the cell quality metric is signaled to the UE via at least one of: radio resource control signaling, a medium access control control element, or downlink control information.

Aspect 36: The method of aspect 33, where, for a particular cell, the cell quality metric is determined based at least in part on a set of strongest synchronization signal blocks of the particular cell.

Aspect 37: The method of any of aspects 27-36, further comprising providing, to the UE, information indicating the set of one or more candidate cells.

Aspect 38: The method of any of aspects 27-37, where the information identifying at least one of the set of one or more candidate cells or the set of one or more selected cells is received via a current selected cell of the UE.

Aspect 39: The method of any of aspects 27-38, where the information identifying at least one of the set of one or more candidate cells or the set of one or more selected cells is received via one or more selected cells of the set of one or more selected cells.

Aspect 40: The method of aspect 39, where the information identifying at least one of the set of one or more candidate cells or the set of one or more selected cells is received via the set of one or more selected cells using an uplink message of a random access channel procedure on the set of one or more selected cells.

Aspect 41: The method of any of aspects 27-40, where the information identifying at least one of the set of one or more candidate cells or the set of one or more selected cells is received via at least one of: radio resource control signaling, a medium access control control element, or uplink control information.

Aspect 42: The method of aspect 41, where the uplink control information is received via at least one of a physical uplink control channel or a physical uplink shared channel.

Aspect 43: The method of any of aspects 27-42, where the information identifying at least one of the set of one or more candidate cells or the set of one or more selected cells indicates cell identifiers or physical cell identifiers associated with the set of one or more candidate cells or the set of one or more selected cells.

Aspect 44: The method of any of aspects 27-43, where the information identifying at least one of the set of one or more candidate cells or the set of one or more selected cells indicates a cell quality metric associated with one or more cells of the set of one or more candidate cells and the set of one or more selected cells.

Aspect 45: The method of any of aspects 27-44, further comprising: transmitting, to the UE, information indicating whether to transmit a cell quality metric associated with one or more cells of the set of one or more candidate cells and the set of one or more selected cells; and selectively receiving the cell quality metric in accordance with the information indicating whether to transmit the cell quality metric.

Aspect 46: The method of aspect 45, where the information indicating whether to transmit the cell quality metric is transmitted via at least one of: radio resource control signaling, a medium access control control element, or downlink control information.

Aspect 47: The method of any of aspects 27-46, where receiving information identifying at least one of the set of one or more candidate cells or the set of one or more selected cells is based at least in part on a periodic transmitting configuration.

Aspect 48: The method of any of aspects 27-48, where receiving information identifying at least one of the set of one or more candidate cells or the set of one or more selected cells is based at least in part on a triggering event.

Aspect 49: The method of aspect 48, where the triggering event is a change of a candidate cell or a selected cell of the UE.

Aspect 50: The method of any of aspects 27-49, further comprising: determining at least one of: information indicating an updated set of one or more candidate cells, or information indicating an updated set of one or more selected cells; and providing at least one of the information indicating the updated set of one or more candidate cells or the information indicating the updated set of one or more selected cells to the UE.

Aspect 51: The method of aspect 50, where the information indicating the updated set of one or more candidate cells or the information indicating the updated set of one or more selected cells is transmitted via at least one of: radio resource control signaling, a medium access control control element, or downlink control information.

Aspect 52: An apparatus for wireless communication at a device, comprising a processor; memory coupled with the processor; and instructions stored in the memory and executable by the processor to cause the apparatus to perform the method of one or more aspects of aspects 1-26.

Aspect 53: A device for wireless communication, comprising a memory and one or more processors coupled to the memory, the memory and the one or more processors configured to perform the method of one or more aspects of aspects 1-26.

Aspect 54: An apparatus for wireless communication, comprising at least one means for performing the method of one or more aspects of aspects 1-26.

Aspect 55: A non-transitory computer-readable medium storing code for wireless communication, the code comprising instructions executable by a processor to perform the method of one or more aspects of aspects 1-26.

Aspect 56: A non-transitory computer-readable medium storing a set of instructions for wireless communication, the set of instructions comprising one or more instructions that, when executed by one or more processors of a device, cause the device to perform the method of one or more aspects of aspects 1-26.

Aspect 52: An apparatus for wireless communication at a device, comprising a processor; memory coupled with the processor; and instructions stored in the memory and executable by the processor to cause the apparatus to perform the method of one or more aspects of aspects 27-51.

Aspect 53: A device for wireless communication, comprising a memory and one or more processors coupled to the memory, the memory and the one or more processors configured to perform the method of one or more aspects of aspects 27-51.

Aspect 54: An apparatus for wireless communication, comprising at least one means for performing the method of one or more aspects of aspects 27-51.

Aspect 55: A non-transitory computer-readable medium storing code for wireless communication, the code comprising instructions executable by a processor to perform the method of one or more aspects of aspects 27-51.

Aspect 56: A non-transitory computer-readable medium storing a set of instructions for wireless communication, the set of instructions comprising one or more instructions that, when executed by one or more processors of a device, cause the device to perform the method of one or more aspects of aspects 27-51.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, or not equal to the threshold, among other examples, or combinations thereof.

It will be apparent that systems or methods described herein may be implemented in different forms of hardware, firmware, or a combination of hardware and software. The actual specialized control hardware or software code used to implement these systems or methods is not limiting of the aspects. Thus, the operation and behavior of the systems or methods were described herein without reference to specific software code—it being understood that software and hardware can be designed to implement the systems or methods based, at least in part, on the description herein.

Even though particular combinations of features are recited in the claims or disclosed in the specification, these combinations are not intended to limit the disclosure of various aspects. In fact, many of these features may be combined in ways not specifically recited in the claims or disclosed in the specification. Although each dependent claim listed below may directly depend on only one claim, the disclosure of various aspects includes each dependent claim in combination with every other claim in the claim set.

As used herein, "or" is used intended to be interpreted in the inclusive sense, unless otherwise explicitly indicated. For example, "a or b" may include a only, b only, or a combination of a and b. As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

No element, act, or instruction used herein is to be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (for example, related items, unrelated items, or a combination of related and unrelated items), and may be used interchangeably with "one or more." Where only one item is intended, the phrase "only one" or similar language is used. Also, as used herein, the terms "has," "have," "having," or the like, or combinations thereof are intended to be open-ended terms. Further, the phrase "based on" is intended to mean "based, at least in part, on" unless explicitly stated otherwise.

What is claimed is:

1. A method of wireless communication performed by a user equipment (UE), comprising:
    selecting, from a set of one or more neighbor cells, a set of one or more candidate cells;
    determining a reference signal received power (RSRP) for the set of one or more candidate cells based at least in part on synchronization signal blocks (SSBs) of a cell;
    determining, from the set of one or more candidate cells, a set of one or more selected cells with corresponding RSRPs that are greater than or equal to a RSRP threshold;
    transmitting, to a network entity and based at least in part on a triggering event, first information identifying the set of one or more selected cells and the corresponding RSRPs, the triggering event including a change to the set of one or more selected cells;
    receiving, from the network entity and based at least in part on transmitting the first information, second information identifying an updated set of one or more selected cells; and
    adding the updated set of one or more selected cells to a cell group of the UE.

2. The method of claim 1, wherein the set of one or more neighbor cells is configured by the network entity.

3. The method of claim 1, further comprising identifying the set of one or more neighbor cells based at least in part on a cell search.

4. The method of claim 1, wherein the set of one or more candidate cells is determined based at least in part on a threshold for a cell quality metric that includes at least one of:
    the RSRP,
    a reference signal received quality (RSRQ), or
    a signal-to-interference-plus-noise ratio (SINR).

5. The method of claim 1, further comprising:
    determining the RSRP for the set of one or more candidate cells based at least in part on a set of strongest SSBs of the cell.

6. The method of claim 4, further comprising transmitting the cell quality metric.

7. The method of claim 1, further comprising:
    receiving a threshold for a cell quality metric; and
    determining a value of the cell quality metric; and
    wherein selecting the set of one or more candidate cells comprises:
        selecting the set of one or more candidate cells based at least in part on the threshold and the value.

8. The method of claim 1, further comprising:
    receiving third information indicating the set of one or more candidate cells, wherein selecting the set of one or more candidate cells is based at least in part on the third information; and
    wherein determining the set of one or more selected cells further comprises determining the set of one or more selected cells based at least in part on the third information.

9. The method of claim 1, wherein transmitting the first information comprises transmitting the first information via a current selected cell of the UE.

10. The method of claim 1, wherein transmitting the first information comprises transmitting the first information via one or more selected cells of the set of one or more selected cells.

11. The method of claim 10, wherein transmitting the first information comprises transmitting the first information via the set of one or more selected cells using an uplink message of a random access channel procedure on the set of one or more selected cells.

12. The method of claim 1, wherein the first information is transmitted via at least one of:
    radio resource control signaling,
    a medium access control control element, or
    uplink control information, wherein the uplink control information is transmitted via at least one of a physical uplink control channel or a physical uplink shared channel.

13. The method of claim 1, wherein the first information is transmitted based at least in part on cell identifiers or physical cell identifiers associated with the set of one or more selected cells.

14. The method of claim 1, further comprising:
    receiving third information indicating whether to transmit a cell quality metric associated with one or more cells of the set of one or more candidate cells and the set of one or more selected cells; and
selectively transmitting the cell quality metric in accordance with the third information.

15. The method of claim 1, further comprising transmitting the first information based at least in part on a periodic transmitting configuration.

16. The method of claim 1, further comprising ÷ transmitting the first information based at least in part on a change to the set of one or more candidate cells.

17. A method of wireless communication performed by a network entity, comprising:
receiving, from a user equipment (UE) and based at least in part on a triggering event, first information identifying a set of one or more selected cells for the UE and corresponding reference signal received powers (RSRPs),
the triggering event including a change to the set of one or more selected cells,
the set of one or more selected cells being selected from a set of one or more candidate cells based at least in part on the corresponding RSRPs being greater than or equal to a RSRP threshold, and
the corresponding RSRPs being based at least in part on synchronization signal blocks (SSBs) of a cell;
performing an inter-cell mobility operation in accordance with the first information identifying the set of one or more selected cells; and
transmitting, to the UE and based at least in part on receiving the first information, second information identifying an updated set of one or more selected cells.

18. The method of claim 17, further comprising configuring a set of one or more neighbor cells for the UE, wherein the set of one or more candidate cells is selected from the set of one or more neighbor cells.

19. The method of claim 17, further comprising configuring, for the UE, a threshold for a cell quality metric for selecting the set of one or more candidate cells.

20. The method of claim 17, wherein the set of one or more candidate cells is determined based at least in part on a threshold for a cell quality metric that includes at least one of:
a RSRP
a reference signal received quality (RSRQ), or
a signal-to-interference-plus-noise ratio (SINR).

21. The method of claim 17, wherein the corresponding RSRPs are based at least in part on a set of strongest SSBs of the cell.

22. The method of claim 20, further comprising receiving third information indicating the cell quality metric from the UE.

23. The method of claim 20, further comprising configuring, for the UE, the threshold for the cell quality metric.

24. The method of claim 17, further comprising transmitting, to the UE, third information indicating the set of one or more candidate cells.

25. The method of claim 17, wherein the first information is received via one of:
a current selected cell of the UE,
one or more selected cells of the set of one or more selected cells, or
the set of one or more selected cells using an uplink message of a random access channel procedure on the set of one or more selected cells.

26. The method of claim 17, wherein the first information indicates cell identifiers or physical cell identifiers associated with the set of one or more selected cells.

27. The method of claim 17, further comprising:
transmitting, to the UE, third information indicating whether to transmit a cell quality metric associated with one or more cells of the set of one or more candidate cells and the set of one or more selected cells; and
selectively receiving the cell quality metric in accordance with the third information.

28. The method of claim 17, further comprising:
determining the second information identifying the updated set of one or more selected cells; and
wherein transmitting the second information comprises transmitting the second information based at least in part on determining the second information.

29. A user equipment (UE), comprising:
one or more memories; and
one or more processors coupled to the one or more memories, the one or more processors configured to:
select, from a set of one or more neighbor cells, a set of one or more candidate cells;
determine a reference signal received power (RSRP) for the set of one or more candidate cells based at least in part on synchronization signal blocks (SSBs) of a cell;
determine, from the set of one or more candidate cells, a set of one or more selected cells with corresponding RSRPs that are greater than or equal to a RSRP threshold;
transmit, to a network entity and based at least in part on a triggering event, first information identifying the set of one or more selected cells and the corresponding RSRPs, the triggering event including a change to the set of one or more selected cells;
receive, from the network entity and based at least in part on the first information being transmitted, second information identifying an updated set of one or more selected cells; and
add the updated set of one or more selected cells to a cell group of the UE.

30. A non-transitory computer-readable medium storing one or more instructions for wireless communication, the one or more instructions comprising:
one or more instructions that, when executed by one or more processors of a user equipment (UE), cause the UE to:
select, from a set of one or more neighbor cells, a set of one or more candidate cells;
determine a reference signal received power (RSRP) for the set of one or more candidate cells based at least in part on synchronization signal blocks (SSBs) of a cell;
determine, from the set of one or more candidate cells, a set of one or more selected cells with corresponding RSRPs that are greater than or equal to a RSRP threshold;
transmit, to a network entity and based at least in part on a triggering event, first information identifying the set of one or more selected cells and the corresponding RSRPs, the triggering event including a change to the set of one or more selected cells;
receive, from the network entity and based at least in part on the first information being transmitted, second information identifying an updated set of one or more selected cells; and
add the updated set of one or more selected cells to a cell group of the UE.

* * * * *